ated Dec. 20, 1960

2,965,444
NONCAKING ROCK SALT COMPOSITION

Horace W. Diamond, Flossmoor, Ill., assignor to Morton Salt Company, Chicago, Ill., a corporation of Illinois No Drawing. Filed May 22, 1958, Ser. No. 736,984

10 Claims. (Cl. 23—89)

This invention relates to noncaking rock salt compositions and more particularly to noncaking rock salt compositions which are particularly adapted for extended outdoor storage and to methods of producing the same.

It is a well known phenomenon associated with the use of rock salt that the crude crushed rock salt material in bulk form has a tendency to fuse or cake into a rigid mass when stored outdoors and subjected to atmospheric moisture and precipitation in the form of rain or snow. This moisture in contact with the crushed rock salt forms a brine solution which, upon subsequent evaporation, forms salt bridges in the cubic system which are quite rigid and serve to fuse the particles of rock salt into an intractable mass which cannot be readily handled or used without crushing into a more suitable particle size. Inasmuch as crushed rock salt is ordinarily handled and stored in large bulk quantities both at the site of mining and at the location of the ultimate consumer, it would be desirable to provide a method of treating crude crushed rock salt which would eliminate the necessity for storing these large bulk quantities either under coverings or within buildings.

Generally the art of treating crude crushed rock salt to permit outdoor storage has only recently been developed. One method of treatment currently in use involves the distribution of a water soluble or alkali metal ferrocyanide such as sodium ferrocyanide to the upper surface of the crushed rock salt pile. These water soluble ferrocyanides have the property when dissolved in brine solutions of altering the crystal habit of the sodium chloride produced by evaporation of the brine from the normal cubic system, which produces strong salt bridges, to the relatively fragile dendritic system which does not fuse the salt particles into a rigid mass.

Inasmuch as those ferrocyanides which have heretofore been used for the surface treatment of bulk crushed rock salt during storage are water soluble, it is quite obvious that prolonged outdoor storage, where the salt pile is subjected to precipitation, will cause the soluble ferrocyanides to leach from the salt and thus remove the protective effect previously exerted. It is also true that since water soluble ferrocyanides are subject to leaching, it is not practical to apply the same by homogeneous mixing throughout the crushed rock salt, since the overall concentration at any particular area of the salt pile is of course considerably reduced and the effects of leaching at this lowered concentration would be considerably accelerated. This of course would apply if one were to use comparable amounts of the soluble ferrocyanide for mixing throughout the rock salt to that amount which is used for surface treatment.

It is clear from the foregoing that the most effective mode of utilizing water soluble ferrocyanide anticaking agents is by surface treatment of the rock salt pile at the site of storage. This is a cumbersome technique involving considerable difficulty and expense, and does not provide adequate protection in transit in open bulk shipment without special treatment. The bulk shipment problem becomes particularly acute when shipping by open railway hopper cars or over water in barges and ships which latter involves unusually rigorous and severe conditions. It would be desirable to provide a noncaking crushed rock salt composition which is resistant to leaching during outdoor storage over an extended period, and maintains its noncaking properties when exposed to precipitation, and which may readily be treated at the point of mining to eliminate the necessity of further treatment of the surface of the rock salt pile at the site of storage or prior to transit.

It would also be advantageous if the crushed rock salt composition utilized anticaking agents which would be effective at relatively low concentrations and which would provide a minimum toxicity hazard to humans and animals coming in contact therewith. This hazard is associated with the use of the treated rock salt on streets and highways in snow and ice control operations, both with respect to the personnel connected with the distribution of the salt, and humans and animals who might come into contact therewith after such distribution.

Accordingly, it is an object of the present invention to provide a noncaking crushed rock salt composition which is highly resistant to the leaching effects of precipitation, and retains its free flowing properties over an extended period of outdoor storage.

Another object is the production of a noncaking crushed rock salt composition which may be readily prepared at the site of mining prior to shipment.

A further object is the provision of a method of treating crude crushed rock salt which eliminates the necessity of surface treatment of the rock salt pile at the site of storage.

A still further object is the provision of a noncaking rock salt composition which is relatively free from toxic hazard and may be freely utilized in populated areas for snow and ice control.

A still further object is the provision of a method of preparing a noncaking crushed rock salt composition which is both simple and economic.

These and other objects of this invention may be seen in the following specification and appended claims.

Accordingly in one broad form the present invention relates to a noncaking crushed rock salt composition adapted for outdoor storage comprising an intimate homogeneous admixture of crude crushed rock salt and a relatively small amount of water dispersible, insoluble ferric ferrocyanide. Generally ferric ferrocyanides which are useful in the production of the noncaking rock salt compositions of the present invention are those of the formula:

FeMFe(CN)$_6$ wherein M is an ion selected from the group consisting of potassium, sodium, lithium, and ammonium, of which the most preferred anticaking agent is the ammonium ferric ferrocyanide.

The present invention also relates to a method of forming the foregoing noncaking rock salt composition which comprises intimately admixing a relatively small amount of the ferric ferrocyanide anticaking agents to distribute the same homogeneously throughout the crude crushed rock salt.

With reference to the foregoing composition, the anticaking agent is incorporated into the crushed rock salt so as to be present in the final composition in a relatively minor proportion with respect to the rock salt. Broadly, the anticaking agent is present in a concentration of from about 0.02 to about 2 pounds of the ferric ferrocyanide compounds per ton of rock salt. A more preferred concentration is from about 0.05 to about 0.5 pound per ton. Alternatively the concentration of the insoluble ferric ferrocyanide may be expressed in terms of parts per million which in the broadest instance corresponds to from about 10 to about 1000 parts per million, and preferably from about 25 to 250 parts per million, based on the rock salt present in said composition.

It is to be understood that the term "crushed rock salt" refers to the mineral halite containing preponderantly sodium chloride with a small percentage of other salts as impurities, such as magnesium chloride and calcium sulfate, all of which are known and vary slightly according to the particular type of deposit from whence the rock salt is mined.

The anticaking agents contemplated for use in the present invention are Prussian blues, which are water insoluble in the classically acepted sense but are capable of forming colloidal suspensions or dispersions in water. These compositions are of low toxicity.

Generally the methods for producing the foregoing compositions comprise mixing a predetermined amount of the insoluble ferric ferrocyanide with the crude crushed rock salt to evenly distribute the same and form a homogeneous composition.

The mode of addition can take a variety of forms such as for example the addition of the ferric ferrocyanide in highly divided and pulverulent form. If desired to insure more adequate and rapid distribution, the ferric ferrocyanide compound may be added in diluted form using an inert diluent such as, for example, talc or a variety of pulverulent materials.

A more preferred form of incorporation is by the formation of an aqueous dispersion of the anticaking agent which may be then incorporated with the crushed rock salt by spraying and/or by mixing. Generally the mixing step following the intrduction of the anticaking agent may be accomplished by a variety of well known means such as agitation, tumbling, etc. It may be desirable in certain instances, particularly at the source of mining, to add the anticaking agent to the rock salt particles as they come from the crusher by means of spraying as the stream of crushed rock salt passes in a continuous stream past a fixed application point.

The aqueous dispersions are readily formed by the addition of a small amount of the anticaking agent tc soft water. Concentrations of from 2% to 4% by weight are suitable. The water utilized should preferably have a degree of hardness not exceeding about 10 grains of calcium (as carbonate) per gallon. While the amount of water is not critical, for even distribution a minimum of about 0.25% by weight based on rock salt has been found satisfactory.

The following example will illustrate one method of incorporation of the anticaking properties of the rock salt compositions of the present invention.

*Example*

A premix or concentrate was first prepared by the addition of an aqueous dispersion of 1.0 pounds of ammonium ferric ferrocyanide in 50 pounds of water to 1000 pounds of crude crushed rock salt. The components were thoroughly mixed in a tumbling mixer until the salt was of a uniform blue color, to form a premix concentrate. The premix was then thoroughly blended with 19,000 pounds of untreated salt in a concrete mixer. Even distribution was visually determined by the coloration of the product. In a manner identical to the foregoing example, crushed rock salt compositions containing ammonium ferric ferrocyanide in varying proportions were prepared. These compositions were placed in outdoor storage for observation. The anticaking properties of these compositions are shown in the following table.

As may be seen from the foregoing example, relatively small amounts of ammonium ferric ferrocyanide homogeneously dispersed throughout crude crushed rock salt are extremely effective for long term protection against caking due to exposure to natural precipitation in outdoor storage.

*Table I*

| Composition | Lbs. of $FeNH_4Fe(CN)_6$ per ton of salt | Observation Time (Days) Elapsed | Results |
| --- | --- | --- | --- |
| A | 0.3 | 256 | Using a blunt ½" steel rod, a penetration of 24" was effected with very little effort. The crust was very thin and in some spots there was no crust at all. The Salt was mealy and damp but showed no signs of setup. |
| B | 0.3 | 254 | Same. |
| C | 0.1 | 253 | Same. |
| Control | None | 253 | Extremely hard—unable to effect any penetration. |

To further investigate the leaching effect of rainfall on the rock salt compositions of the present invention as compared to those utilizing sodium ferrocyanide, an experiment was conducted which involved a comparison of crushed rock salt which had been treated in one instance with sodium ferrocyanide and in the second instance with ammonium ferric ferrocyanide, and then subjected to outdoor storage under identical conditions. After a period of two months the concentration of the sodium ferrocyanide at a point one and one-half feet below the surface of the salt pile was 2% of that at the start of the test.

In the second test pile containing the ferric ferrocyanide, 39% of the original concentration remained after the same period of observation. This test would indicate a leaching rate for the soluble ferrocyanides of about twenty times greater than that for the ammonium ferric ferrocyanides.

While the foregoing experiments are specific to the use of ammonium ferric ferrocyanide it is of course to be understood that the other insoluble ferric ferrocyanides contemplated herein have similar and comparable utility as anticaking agents.

It is also clear that the crushed rock salt compositions of the present invention are well adapted for extended outdoor storage and are resistant to the leaching effect of rainfall and other forms of precipitation. Additionally, the process herein provided is adapted for treatment of crude crus ed rock salt at the site of mining to provide a noncaking rock salt composition which may be loaded and shipped in open barges or railroad cars without special surface treatment and still maintain its free flowing characteristics.

It should further be understood that the methods herein disclosed may be applied to many grades of crushed rock salt which are stored out-of-doors such as, for example, the various screened grades of rock salt.

While several particular embodiments of this invention suggested above, it will be understood, of course, that the invention is not to be limited thereto since many modifications may be made and it is contemplated therefore by the appended claims to cover any such modifications as fall within the true spirit and scope of this invention.

What is claimed is:

1. A noncaking crushed rock salt composition adapted for outdoor storage, which comprises a homogeneous admixture of crude crushed rock salt and an anticaking agent of the formula $$FeMFe(CN)_6$$

wherein M is an ion selected from the group consisting of potassium, sodium, lithium and ammonium said anticaking agent being present in a ratio of from about 0.02 to 2 pounds per ton of rock salt.

2. The composition of claim 1 wherein the anticaking agent is present in the admixture in a ratio of from 0.05 to 0.5 pound per ton of rock salt.

3. A noncaking crushed rock salt composition adapted for outdoor storage comprising a homogeneous admixture of crude crushed rock salt and from 10 to 1000 parts per million of ammonium ferric ferrocyanide.

4. A noncaking crushed rock salt composition adapted for outdoor storage comprising a homogeneous admixture of crude crushed rock salt and from 10 to 1000 parts per million of sodium ferric ferrocyanide.

5. A noncaking crushed rock salt composition adapted for outdoor storage comprising a homogeneous admixture of crude crushed rock salt and from 10 to 1000 parts per million of potassium ferric ferrocyanide.

6. A noncaking crushed rock salt composition adapted for outdoor storage comprising a homogeneous admixture of crude crushed rock salt and from 10 to 1000 parts per million of lithium ferric ferrocyanide.

7. A noncaking crushed rock salt composition comprising a homogeneous admixture of crushed rock salt and from 0.02 to 2 pounds per ton of rock salt of an insoluble ferric ferrocyanide anticaking agent selected from the group consisting of potassium ferric ferrocyanide, sodium ferric ferrocyanide, lithium ferric ferrocyanide, and ammonium ferric ferrocyanide, said composition being characterized as maintaining a noncaking condition during outdoor storage, resistant to leaching of the anticaking agent, and being relatively nontoxic.

8. A process for preparing a noncaking crushed rock salt composition which comprises homogeneously mixing a crude crushed rock salt with from 10 to 1000 parts per million with respect to the crushed rock salt of a ferric ferrocyanide selected from the group consisting of potassium ferric ferrocyanide, sodium ferric ferrocyanide, lithium ferric ferrocyanide and ammonium ferric ferrocyanide.

9. The process of claim 8 wherein the ferrocyanide is ammonium ferric ferrocyanide.

10. The process of claim 8 wherein the ferric ferrocyanide is incorporated as an aqueous dispersion.

References Cited in the file of this patent

UNITED STATES PATENTS

| | | |
|---|---|---|
| 2,642,335 | May et al. | Jan. 16, 1953 |

FOREIGN PATENTS

| | | |
|---|---|---|
| 752,582 | Great Britain | July 11, 1956 |

UNITED STATES PATENT OFFICE
CERTIFICATION OF CORRECTION

Patent No. 2,965,444 December 20, 1960

Horace W. Diamond

It is hereby certified that error appears in the above numbered patent requiring correction and that the said Letters Patent should read as corrected below.

Column 2, line 69, for "compounds" read -- compound --; column 3, line 7, for "smal" read -- small --; line 14, for "acepted" read -- accepted --; line 33, for " intrduction" read -- introduction --; line 70, strike out the paragraph beginning with "As may be seen from" and ending with "door storage", in line 75, same column, and insert the same below Table I, column 4; column 4, line 57, before "suggested" insert -- are --; column 5, line 18, before "crushed rock salt" insert -- a crude --.

Signed and sealed this 23rd day of May 1961.

(SEAL)
Attest:

ERNEST W. SWIDER
Attesting Officer

DAVID L. LADD
Commissioner of Patents